United States Patent
Zhang et al.

(10) Patent No.: US 11,381,725 B2
(45) Date of Patent: Jul. 5, 2022

(54) ELECTRONIC DEVICES AND METHOD FOR CONTROLLING CAMERA MODULE

(71) Applicant: GUANGDONG OPPO MOBILE TELECOMMUNICATIONS CORP., LTD., Guangdong (CN)

(72) Inventors: Xiang Zhang, Guangdong (CN); Zanjian Zeng, Guangdong (CN)

(73) Assignees: GUANGDONG OPPO MOBILE, Dongguan (CN); TELECOMMUNICATIONS CORP., LTD., Dongguan (CN)

( * ) Notice: Subject to any disclaimer, the term of this patent is extended or adjusted under 35 U.S.C. 154(b) by 8 days.

(21) Appl. No.: 16/990,492

(22) Filed: Aug. 11, 2020

(65) Prior Publication Data

US 2020/0374433 A1 Nov. 26, 2020

Related U.S. Application Data

(63) Continuation of application No. PCT/CN2018/121828, filed on Dec. 18, 2018.

(30) Foreign Application Priority Data

Feb. 13, 2018 (CN) .................. 201810150737.X

(51) Int. Cl.
*H04N 5/225* (2006.01)
*G06F 1/16* (2006.01)
(Continued)

(52) U.S. Cl.
CPC ......... *H04N 5/2257* (2013.01); *G06F 1/1686* (2013.01); *H04M 1/0264* (2013.01); *H04N 5/2252* (2013.01)

(58) Field of Classification Search
USPC .......................................... 396/100
See application file for complete search history.

(56) References Cited

U.S. PATENT DOCUMENTS 10,579,108 B2 * 3/2020 Dilaura ................ G06F 1/1686
10,601,969 B2 * 3/2020 Bao ...................... H04M 1/0264
(Continued)

FOREIGN PATENT DOCUMENTS

CN 2717138 Y 8/2005
CN 201967013 U 9/2011
(Continued)

OTHER PUBLICATIONS

Extended European Search Report for EP Application 18906608.7 dated Mar. 12, 2021. (10 pages).
(Continued)

*Primary Examiner* — Clayton E. LaBalle
*Assistant Examiner* — Warren K Fenwick
(74) *Attorney, Agent, or Firm* — Young Basile Hanlon & MacFarlane, P.C.

(57) ABSTRACT

An electronic device and a method for controlling a camera module are provided according to implementations of the present disclosure. The electronic device includes a housing, a camera module, a pushing mechanism, and a reversing mechanism. The camera module disposed in the housing. The pushing mechanism is configured to drive the camera module to move from an inside of the housing to an outside of the housing. The reversing mechanism is configured to reverse the camera module when the camera module is moved to the outside of the housing.

13 Claims, 12 Drawing Sheets

(51) Int. Cl.
*H04M 1/22* (2006.01)
*H04M 1/02* (2006.01)

(56) References Cited

U.S. PATENT DOCUMENTS

| | | | |
|---|---|---|---|
| 2010/0053409 | A1 | 3/2010 | Chang |
| 2016/0316046 | A1* | 10/2016 | Zheng ................ H04M 1/0264 |
| 2016/0337492 | A1 | 11/2016 | Tseng |
| 2017/0244903 | A1* | 8/2017 | Yang ................ H04N 5/23296 |
| 2020/0366851 | A1* | 11/2020 | Zhang ................ H04N 5/2257 |

FOREIGN PATENT DOCUMENTS

| | | |
|---|---|---|
| CN | 203423741 U | 2/2014 |
| CN | 203722706 U | 7/2014 |
| CN | 104038683 B | 9/2014 |
| CN | 203933810 U | 11/2014 |
| CN | 203984539 U | 12/2014 |
| CN | 204103976 U | 1/2015 |
| CN | 204216968 U | 3/2015 |
| CN | 204652455 U | 9/2015 |
| CN | 105049686 A | 11/2015 |
| CN | 106331450 A | 1/2017 |
| CN | 106850896 A | 6/2017 |
| CN | 106856516 A | 6/2017 |
| CN | 107197133 A | 9/2017 |
| CN | 107257398 A | 10/2017 |
| CN | 107295129 A | 10/2017 |
| CN | 206894706 U | 1/2018 |
| CN | 107682610 A | 2/2018 |
| JP | 2005223634 A | 8/2005 |
| KR | 20050088771 A | 9/2005 |
| KR | 100626977 B1 | 9/2006 |
| WO | 0163926 A1 | 8/2001 |

OTHER PUBLICATIONS

Decision for rejection with English Translation issued in corresponding CN application No. 201810150737.X dated Dec. 14, 2020.
English translation of International search report issued in corresponding international application No. PCT/CN2018/121828 dated Mar. 15, 2019.
English translation of the first OA issued in corresponding CN application No. 201810150737.X dated Dec. 13, 2019.
English translation of the second OA issued in corresponding CN application No. 201810150737.X dated Jul. 8, 2020.
English translation of the Office Action 1 issued in corresponding CN application No. 201810150794.8 dated Dec. 31, 2019.
English translation of the International search report issued in corresponding international application No. PCT/CN2018/121819 dated Feb. 28, 2019.
Communication pursuant to Rule 164(1) EPC for EP Application No. 18906263.1 dated Jun. 10, 2021. (20 pages).
Indian Examination Report for IN Application 202017025480 dated Aug. 17, 2021. (7 pages).
Indian Examination Report for IN Application 202017026423 dated Aug. 16, 2021. (6 pages).
Chinese Notice of Review with English Translation for CN Application 201810150737.X dated Aug. 13, 2021. (19 pages).
Extended European Search Report for EP Application 18906263.1 dated Oct. 11, 2021. (19 pages).
Chinese Office Action with English Translation for CN Application 201810150737.X dated Nov. 30, 2021. (26 pages).
Non-Final Office Action for U.S. Appl. No. 16/944,966 dated Mar. 2, 2022. (35 pages).

* cited by examiner

ELECTRONIC DEVICES AND METHOD FOR CONTROLLING CAMERA MODULE

CROSS-REFERENCE TO RELATED APPLICATION(S)

This application is a continuation of International Patent Application No. PCT/CN 2018/121828, filed on Dec. 18, 2018, which claims priority to Chinese Patent Application Serial No. 201810150737.X, filed on Feb. 13, 2018, the disclosures of both of which are hereby incorporated by reference in their entireties.

TECHNICAL FIELD

This disclosure relates to the technical field of electronic devices, and in particular, to electronic devices and a method for controlling a camera module.

BACKGROUND

With advances in science and technology and the development in society, network technologies and intelligence of electronic devices are improved, and users can shoot through the electronic devices.

Generally, the electronic device has a shooting function. The electronic device is generally provided with a front camera and a rear camera. The electronic device can switch between the front camera and the rear camera while shooting. The front camera is mainly for selfies.

With increasing requirements of the users, how to increase a screen-to-body ratio of the electronic device for a more extreme display experience has become a hot research topic. However, in order to install the front camera, the electronic device now inevitably needs to define an additional opening or a non-display region on a display screen of the electronic device, resulting in a reduction in an area of a display region of the display screen.

SUMMARY

Electronic devices and a method for controlling a camera module are provided according to implementations of the present disclosure.

An electronic device is provided according to the implementations of the present disclosure. The electronic device includes a housing, a camera module, a pushing mechanism, and a reversing mechanism. The camera module is disposed in the housing. The pushing mechanism is configured to drive the camera module to move from an inside of the housing to an outside of the housing. The reversing mechanism is configured to reverse the camera module when the camera module is moved to the outside of the housing.

An electronic device is further provided according to the implementations of the present disclosure. The electronic device includes a display surface and a non-display surface opposite the display surface, a housing, a camera module, a pushing mechanism, and a reversing mechanism. The housing defines an accommodation groove. The camera module is received in the accommodation groove. The pushing mechanism includes a first coil, a second coil, a third coil, a first magnet, a second magnet, and a third magnet. The first coil is disposed in a sidewall of the accommodating groove close to the display surface (that is, the first coil is disposed in a wall of the housing close to the display surface). The first magnet is disposed on an end of the camera module close to the display surface. The second coil is disposed on two sidewalls of the accommodation groove defined in the housing. The second magnet is disposed on two sides of the camera module corresponding to the second coil. The third coil is disposed on a bottom wall of the accommodating groove. The third magnet is disposed on a bottom of the camera module and faces the third coil. The reversing mechanism is mounted between a periphery of the housing and the camera module. The reversing mechanism is coupled with the camera module and configured to reverse the camera module to be beyond the periphery of the housing.

A method for controlling a camera module applicable to an electronic device is further provided according to the present disclosure. The electronic device includes a housing, a camera module, a pushing mechanism, and a reversing mechanism. The camera module, the pushing mechanism, the reversing mechanism, and a processor are disposed in the housing. The pushing mechanism and reversing mechanism are electrically coupled with the processor. The method for controlling the camera module includes the following. An operation instruction is acquired. The processor starts the pushing mechanism in response to the operation instruction to drive the camera module to move from an inside of the housing to an outside of the housing. The processor activates the reversing mechanism to reverse the camera module when the camera module is moved to the outside of the housing.

BRIEF DESCRIPTION OF THE DRAWINGS

To describe technical solutions in the implementations of the present disclosure more clearly, the following briefly introduces the accompanying drawings required for describing the implementations. Apparently, the accompanying drawings in the following description merely illustrate some implementations of the present disclosure. Those of ordinary skill in the art may also obtain other obvious variations based on these accompanying drawings without creative efforts.

DETAILED DESCRIPTION

Figure 1:
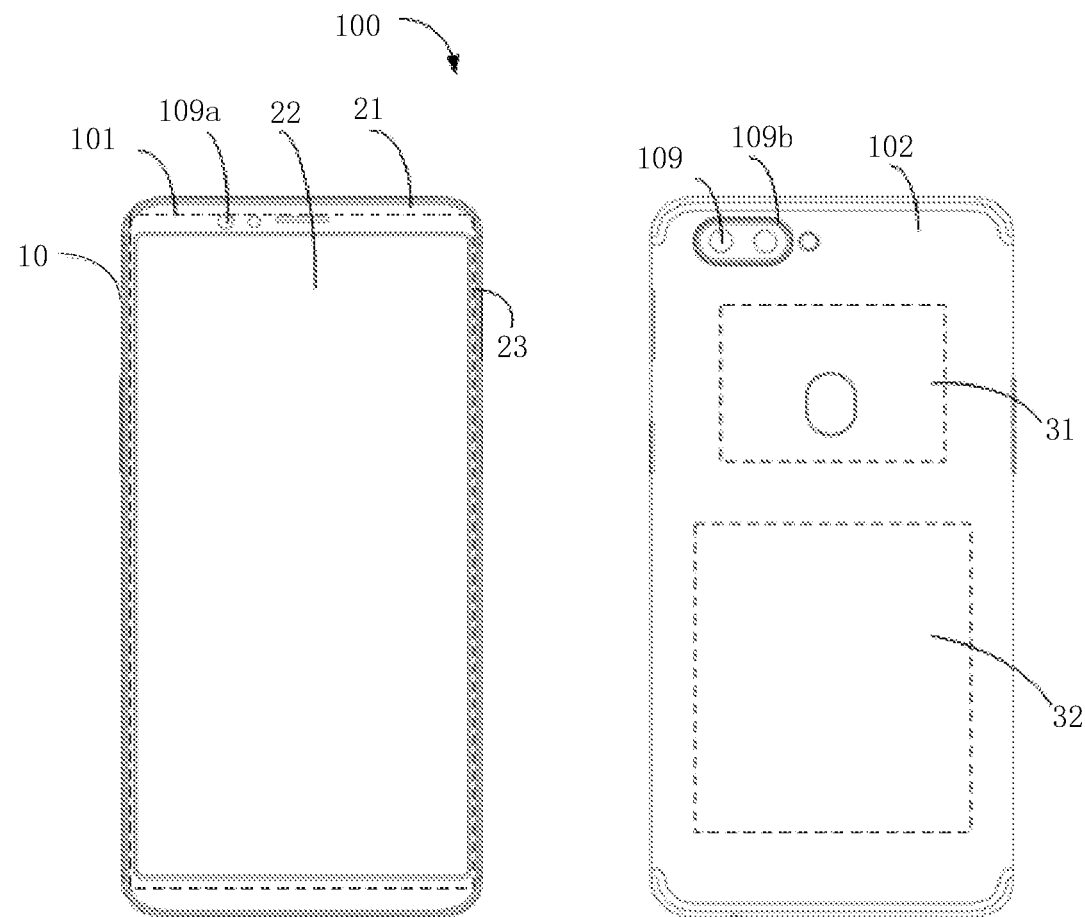
FIG. 1 is a perspective view of an electronic device according to an implementation of the present disclosure.

The technical solutions in the implementations of the present disclosure are clearly and completely described in the following with reference to the accompanying drawings in the implementations of the present disclosure. Apparently, the described implementations are merely a part of rather than all the implementations of the present disclosure. All other implementations obtained by those of ordinary skill in the art based on the implementations of the present disclosure without creative efforts are within the scope of the present disclosure.

An electronic device is provided according to the implementations of the present disclosure. The electronic device includes a housing, a camera module, a pushing mechanism, and a reversing mechanism. The camera module is disposed in the housing. The pushing mechanism is configured to drive the camera module to move from an inside of the housing to an outside of the housing. The reversing mechanism is configured to reverse the camera module when the camera module is moved to the outside of the housing.

In an implementation, the electronic device has a display surface and a non-display surface opposite the display surface. The pushing mechanism is configured to drive the camera module to move in a direction parallel to the display surface. When the camera module is beyond a periphery of the housing, the reversing mechanism is configured to reverse the camera module to enable the camera module to be switched from being used as a rear camera to being used as a front camera.

In an implementation, the pushing mechanism is configured to drive the camera module to move beyond a first sidewall of the housing from the inside of the housing.

In an implementation, the pushing mechanism is configured to drive the camera module to move beyond a second sidewall of the housing from the inside of the housing.

In an implementation, the pushing mechanism is configured to drive the camera module to move beyond a third sidewall of the housing from the inside of the housing.

In an implementation, the pushing mechanism is configured to drive the camera module to move beyond a fourth sidewall of the housing from the inside of the housing.

In an implementation, the camera module has a first surface close to the periphery of the housing and a second surface opposite the first surface. The pushing mechanism includes a first magnetic member and a second magnetic member. The first magnetic member is disposed on the second surface of the camera module, and the second magnetic member is disposed in the housing and faces the first magnetic member.

In an implementation, the reversing mechanism includes a driving motor and a telescopic rod. The driving motor is disposed in the housing and coupled with the telescopic rod. The telescopic rod is fixedly connected with the second surface. The driving motor is configured to drive the telescopic rod to rotate, and rotation of the telescopic rod enables rotation of the camera module.

In an implementation, the electronic device has a display surface and a non-display surface opposite the display surface. The pushing mechanism is configured to drive the camera module to move in a direction from the display surface to the non-display surface. The reversing mechanism is configured to reverse the camera module to be beyond a periphery of the housing when the camera module is driven to the outside of the housing by the pushing mechanism.

In an implementation, the pushing mechanism is configured to drive the camera module to move to the outside of the housing in a direction perpendicular to the display surface.

In an implementation, the pushing mechanism is configured to drive the camera module to move to the outside of the housing in a direction oblique to the display surface.

In an implementation, the housing has a first outer sidewall. The first outer sidewall is one of a first sidewall, a second sidewall, a third sidewall, or a fourth sidewall of the housing. The reversing mechanism is configured to reverse the camera module to be beyond one of the first sidewall, the second sidewall, the third sidewall, or the fourth sidewall, so as to enable a camera of the camera module reversed to be switched from being used as the rear camera to being used as the front camera.

In an implementation, the reversing mechanism includes a first reversing portion and a second reversing portion. The first reversing portion is configured to reverse the camera module to be beyond the periphery of the housing. The second reversing portion is configured to reverse the camera module to enable a camera of the camera module to be switched from being used as the rear camera to being used as the front camera.

In an implementation, the pushing mechanism includes a third magnetic member and a fourth magnetic member. The third magnetic member is disposed in the housing. The fourth magnetic member is disposed on the camera module. The third magnetic member is configured to drive the fourth magnetic member to move.

In an implementation, the housing defines an accommodating groove. The camera module is received in the accommodating groove. The third magnetic member includes a first coil. The first coil is disposed in a sidewall of the accommodating groove close to the display surface and the accommodating groove is defined in the housing. The fourth magnetic member includes a first magnet. The first magnet is disposed on a side of the camera module close to the display surface and faces the first coil.

In an implementation, the reversing mechanism is mounted between the periphery of the housing and the camera module. The reversing mechanism includes a rotating shaft, a connecting rod, and a driving device. The rotating shaft is rotatably connected with the housing. The connecting rod has an end fixedly connected with the rotating shaft and another end connected with the camera module. The driving device is mounted on the housing, and the driving device is fixedly connected with the rotating shaft and is configured to drive the rotating shaft to rotate.

In an implementation, the reversing mechanism is configured to drive the camera module to reverse about a lateral axis of the camera module.

In an implementation, the reversing mechanism is configured to drive the camera module to reverse about a longitudinal axis of the camera module.

An electronic device is provided according to the implementations of the present disclosure. The electronic device includes a display surface and a non-display surface opposite the display surface, a housing, a camera module, a pushing mechanism, and a reversing mechanism. The housing defines an accommodation groove. The camera module is received in the accommodation groove. The pushing mechanism includes a first coil, a second coil, a third coil, a first magnet, a second magnet, and a third magnet. The first coil is disposed in a sidewall of the accommodating groove close to the display surface. The first magnet is disposed on the side of the camera module close to the display surface and faces the first coil. The second coil is disposed on two sidewalls of the accommodation groove defined in the housing. The second magnet is disposed on two sides of the camera module corresponding to the second coil. The third coil is disposed on a bottom wall of the accommodating groove. The third magnet is disposed on a bottom of the camera module and faces the third coil. The reversing mechanism is mounted between a periphery of the housing and the camera module. The reversing mechanism is coupled with the camera module and configured to reverse the camera module to be beyond the periphery of the housing.

In an implementation, the camera module has a first surface close to the periphery of the housing and a second surface opposite the first surface. The reversing mechanism includes a driving motor and a telescopic rod, where the driving motor is disposed in the housing and coupled with the telescopic rod, the telescopic rod is fixedly connected with the second surface, the driving motor is configured to drive the telescopic rod to rotate, and rotation of the telescopic rod enables rotation of the camera module.

In an implementation, the housing has four sidewalls surrounding the display surface. The pushing mechanism is configured to drive the camera module to move beyond any one of the four sidewalls from the inside of the housing.

In an implementation, the pushing mechanism is configured to drive the camera module to move in a direction parallel to the display surface. When the camera module is beyond the periphery of the housing, the reversing mechanism is configured to reverse the camera module to enable the camera module to be switched from being used as a rear camera to being used as a front camera.

A method for controlling a camera module applicable to an electronic device is provided according to the present disclosure. The electronic device includes a housing, a camera module, a pushing mechanism, and a reversing mechanism. The camera module, the pushing mechanism, the reversing mechanism, and a processor are disposed in the housing. The pushing mechanism and reversing mechanism are electrically coupled with the processor. The method for controlling the camera module includes the following.

An operation instruction is acquired. The processor starts the pushing mechanism in response to the operation instruction to drive the camera module to move from an inside of the housing to an outside of the housing. The processor activates the reversing mechanism to reverse the camera module when the camera module is moved to the outside of the housing.

According to the above-mentioned electronic devices and the method for controlling the camera module applicable to the electronic device, an increased screen-to-body ratio of the electronic device is provided.

In an implementation, the processor starts the pushing mechanism in response to the operation instruction to drive the camera module to move from the inside of the housing to the outside of the housing as follows. The processor starts the pushing mechanism in response to the operation instruction to drive the camera module to move beyond any of sidewalls of the housing, where the sidewalls of the housing surrounds a display surface of the electronic device.

In an implementation, the processor starts the pushing mechanism in response to the operation instruction to drive the camera module to move from the inside of the housing to the outside of the housing as follows. The processor starts the pushing mechanism in response to the operation instruction to drive the camera module to move in a direction parallel to a display surface of the electronic device to the outside of the housing. The processor activates the reversing mechanism to reverse the camera module when the camera module is moved to the outside of the housing as follows. The processor activates the reversing mechanism to reverse the camera module when the camera module is moved to the outside of the housing, where the camera module reversed is operable to be switched from being used as a rear camera to being used as a front camera of the electronic device.

The electronic devices are provided according to implementations of the present disclosure, and details will be described below. The electronic devices may include a smart phone, a tablet computer, or the like.

Referring to FIG. 1, the electronic device 100 includes a housing 10. The housing 10 includes a front housing 101 and a rear housing 102. The front housing 101 may include a protective cover 21, a display screen 22, and the like. The front housing 101 has a display surface for displaying and the rear housing 102 includes a non-display surface opposite the display surface. The front housing 101 and the rear housing 102 cooperatively define an accommodation space. The electronic device 100 further includes a pushing mechanism 41, a reversing mechanism 42, a circuit board 31, and a battery 32. The pushing mechanism 41, the reversing mechanism 42, the circuit board 31, and the battery 32 are all accommodated in the accommodation space.

In the implementations of the present disclosure, the pushing mechanism 41 is a driving mechanism configured to drive a camera module 109 to move to the outside of the housing 10 from the inside of the housing 10, or configured to drive the camera module 109 to move back to the inside of the housing 10 from the outside of the housing 10. The reversing mechanism 42 is a driving mechanism configured to drive the camera module 109 to rotate.

In the implementations, the front housing 101 and the rear housing 102 may be made of metal. It is noted that materials of the front housing 101 and the rear housing 102 in the implementations of the present disclosure are not limited thereto, and other materials may also be employed for manufacturing the front housing 101 and the rear housing 102. For example, the front housing 101 and the rear housing 102 may include a plastic part and a metal part. For another example, the front housing 101 and the rear housing 102 may be plastic housings.

The protective cover 21 may be made of glass, sapphire, plastic, etc. The protective cover 21 can protect the display screen 22 and prevent dust, moisture, or oil stains from being attached to the display screen 22, thereby preventing ambient environment from corroding the display screen 22. In addition, the protective cover 21 can prevent the display screen 22 from being subjected to impact forces from the ambient environment, thereby preventing the display screen 22 from being broken.

The protective cover 21 may has a display region and a non-display region. The display region is transparent and faces a light-exiting surface of the display screen 22. The non-display region is non-transparent to cover internal structures of the electronic device 100. The non-display region may define openings for transmission of sound and light.

The front housing 101 defines an opening 109a, and the rear housing 102 defines an opening 109b. The opening 109a and the opening 109b are arranged corresponding to the camera module 109. It is noted that the camera module 109 may include a camera. The camera of the camera module 109 faces the opening 109a when the camera module 109 is used as the front camera, and the camera of the camera module 109 faces the opening 109b when the camera module 109 is used as the rear camera. The camera may include a single camera, double cameras, or multiple cameras. It is noted that the camera module is not limited thereto. The camera module 109 may further include functional components such as a flashlight, an earpiece, a microphone, a light sensor, and the like. In addition, a structure of the camera module can be changed and determined according to needs, and will not be repeated herein.

It is noted that the camera module 109 has a first surface 1091 close to a periphery of the housing 10 and a second surface 1092 opposite the first surface 1091.

It is noted that the display screen 22 of the electronic device 100 according to the implementations of the present disclosure may be a full screen. Of course, the display screen 22 may also be a special-shaped screen (that is, a screen includes an incomplete region that does not belong to a display region and cannot display contents). The display screen 22 may be designed according to the needs, which will not be repeated herein.

Figure 2:
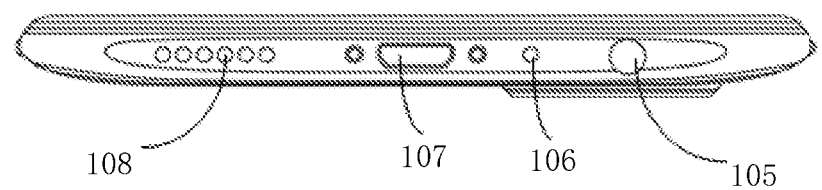
FIG. 2 is a bottom view of the electronic device according to an implementation of the present disclosure.

Referring to FIG. 2, the electronic device 100 may define an earphone hole 105, a microphone hole 106, speaker holes 108, and a universal serial bus interface hole 107 at the periphery of the housing 10. All the earphone hole 105, the microphone hole 106, the speaker holes 108, and the universal serial bus interface hole 107 may be through holes.

Figure 3:
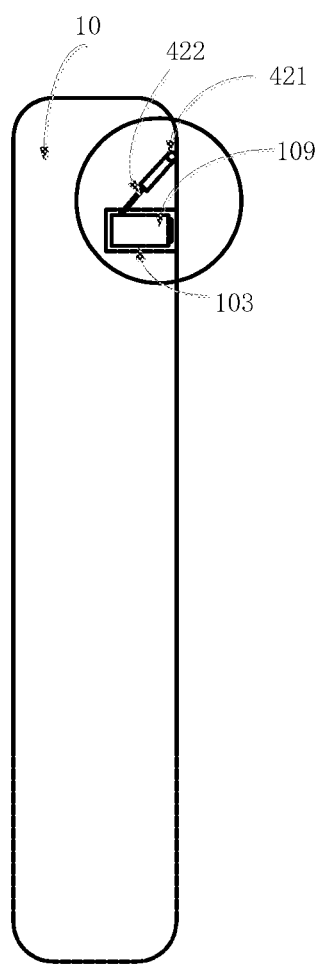
FIG. 3 is a side view of the electronic device according to an implementation of the present disclosure.
Figure 4:
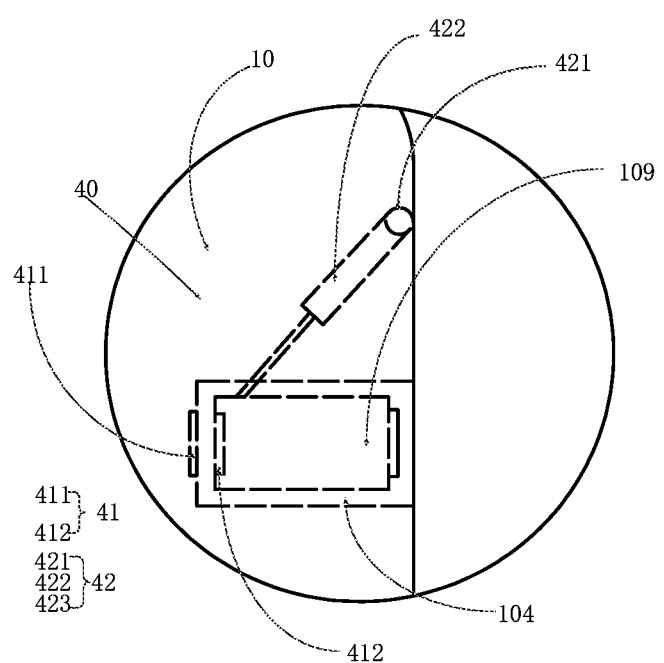
FIG. 4 is an enlarged schematic view of a pushing mechanism of the electronic device according to an implementation of the present disclosure.

Referring FIGS. 3 to 4, in some implementations, the rear housing 102 and the front housing 101 cooperatively define an accommodating groove 103 for accommodating the camera module 109. The pushing mechanism 41 and the reversing mechanism 42 are disposed in the housing 10. The pushing mechanism 41 can drive the camera module 109 to move from an inside of the housing 10 to an outside of the housing 10. When the camera module 109 is driven to the outside of the housing 10, the reversing mechanism 42 can reverse the camera module 109, so as to drive the camera module 109 to reverse from being oriented toward a same direction as the non-display surface to being oriented toward a same direction as the display surface. It is noted that, when the camera module 109 is oriented toward the same direction as the non-display surface, the camera module 109 can be used as a rear camera to perform a rear shooting, and when the camera module 109 is oriented toward the same direction as the display surface, the camera module 109 can be used as a front camera to perform a front shooting. For example, in an implementation, the camera module 109 being switched from being oriented toward the same direction as the non-display surface to being oriented toward the same direction as the display surface, means that the camera module 109 is rotated 180 degrees about an axis in parallel with the non-display surface and the display surface.

In an implementation, the pushing mechanism 41 can drive the camera module 109 to move out from the accommodating groove 103 in a direction from the front housing 101 to the rear housing 102, and then the reversing mechanism 42 can drive the camera module 109 to move beyond a periphery of the rear housing 102, so as to switch the camera module 109 from being used as the front camera to being used as the rear camera. Alternatively, the pushing mechanism 41 can drive the camera module 109 to move beyond the periphery of the housing 10 from the inside of the housing 10, and then the reversing mechanism 42 can reverse the camera module 109, so as to switch the camera module 109 from being used as the front camera to being used as the rear camera. In the implementations of the present disclosure, a pushing operation and a reversing operation for the camera module 109 via the pushing mechanism 41 and the reversing mechanism 42 are achieved in various manners. For example, as an implementation, the pushing and reversing operations are manual operations. Alternatively, the pushing mechanism 41 and the reversing mechanism 42 can be driven by a power mechanism to implement the pushing and reversing operations. The power mechanism may include one power mechanism, two power mechanisms, or multiple power mechanisms. The number of power mechanisms adopted is not limited herein.

In an implementation, the reversing mechanism 42 can drive the camera module 109 to reverse about a lateral axis of the camera module 109. Alternatively, the reversing mechanism 42 can drive the camera module 109 to reverse about a longitudinal axis of the camera module 109. In an implementation, the reversing mechanism 42 can drive the camera module 109 to rotate 180 degrees about the lateral axis of the camera module 109, such that the camera module 109 is reversed about the lateral axis of the camera module 109. Alternatively, the reversing mechanism 42 can drive the camera module 109 to rotate 180 degrees about the longitudinal axis of the camera module 109, such that the camera module 109 is reversed about the longitudinal axis of the camera module 109.

In some implementations, the camera module 109 can be reversed once, twice, or more times through the reversing mechanism 42. For example, as an implementation, the reversing mechanism 42 includes a first reversing portion and a second reversing portion. The first reversing portion can reverse the camera module 109 to be beyond the periphery of the housing 10, and the second reversing portion can reverse the camera module 109 to enable the camera of the camera module 109 to face (that is, be oriented toward) the same direction as the display surface. Of course, manners for reversing the camera module 109 are not limited thereto, which will not be repeated herein.

Figure 5:
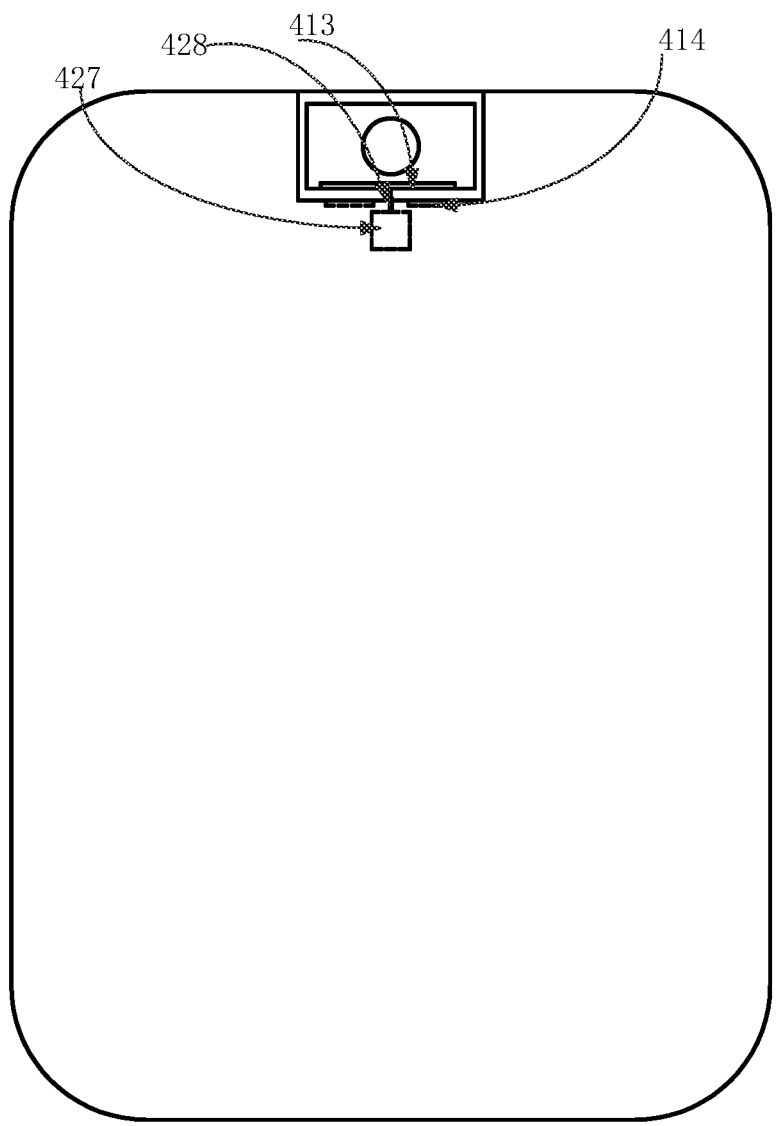
FIG. 5 is a schematic view illustrating a first implementation of the pushing mechanism of the electronic device according to an implementation of the present disclosure.
Figure 6:
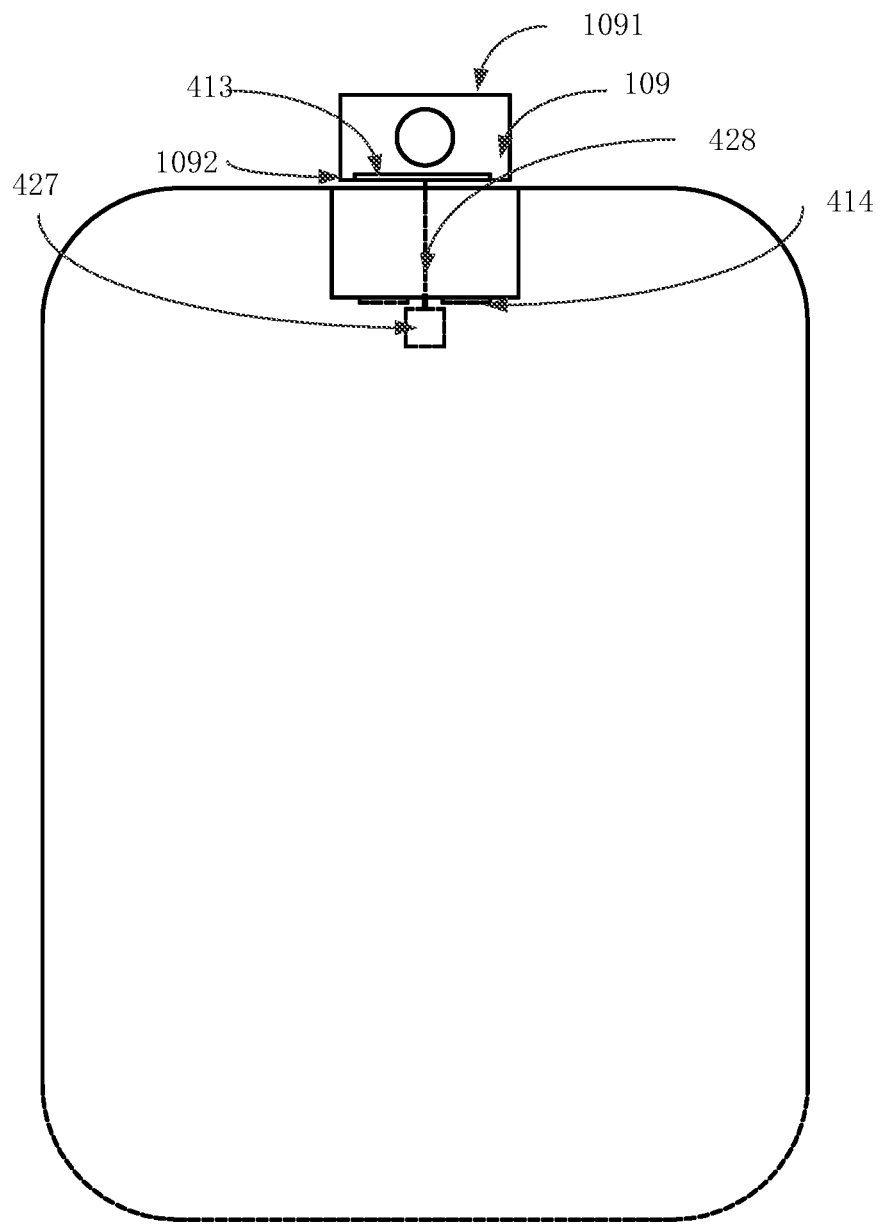
FIG. 6 is a schematic view illustrating the first implementation of the pushing mechanism of the electronic device according to an implementation of the present disclosure, illustrating a camera module being outside the electronic device.
Figure 7:
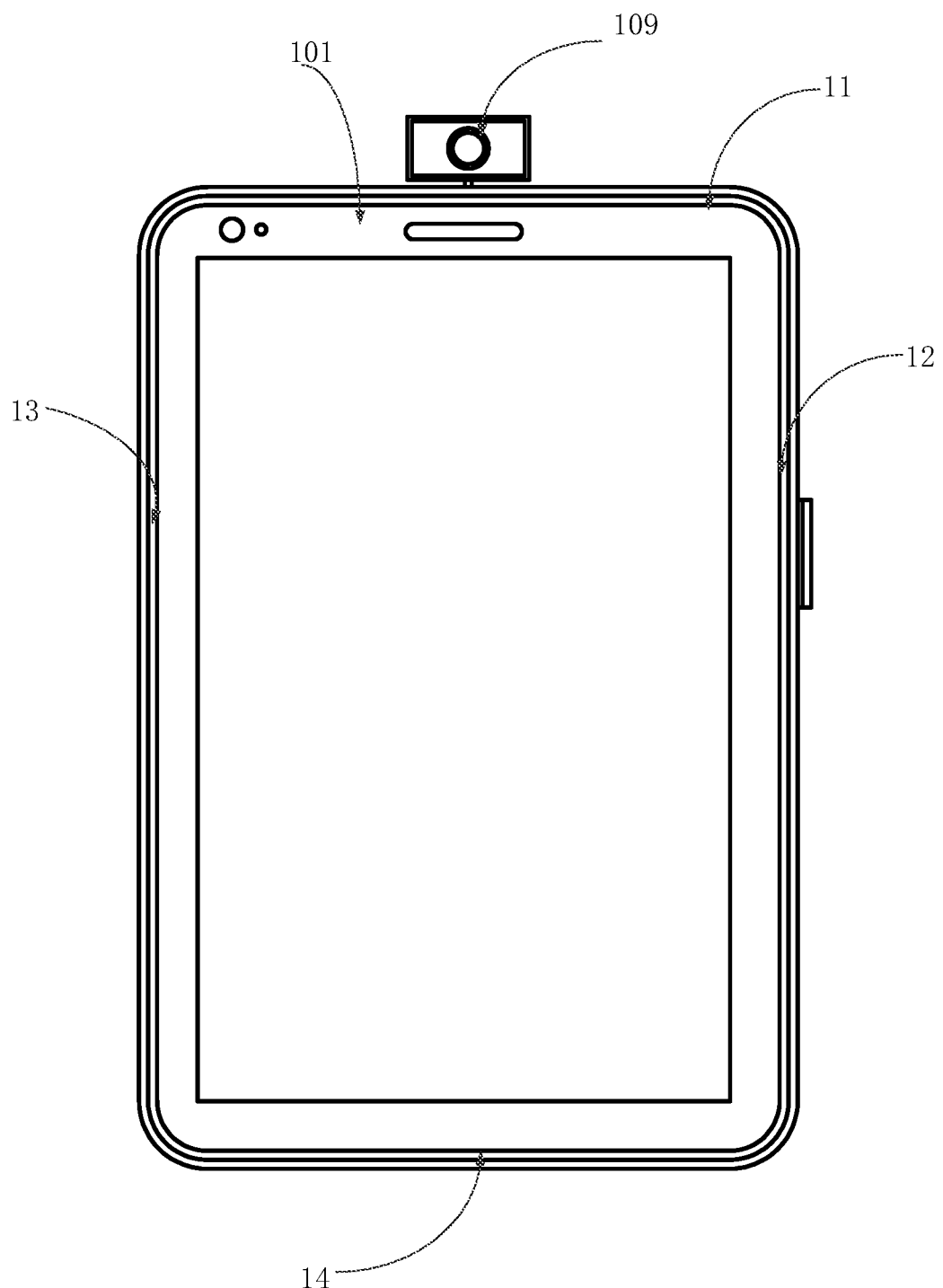
FIG. 7 is a schematic view of the electronic device according to an implementation of the present disclosure, illustrating the camera module being reversed.

Referring to FIGS. 5 to 7, the pushing mechanism 41 can drive the camera module 109 to move in a direction parallel to the display surface. When the camera module 109 is beyond the periphery of the housing 10, the reversing mechanism 42 can reverse the camera module 109 to be switched from being used as the rear camera to being used as the front camera.

Currently, in order to install the camera module 109, it is inevitably to define an opening or non-display region on the display screen of the electronic device 100, resulting in a reduction in an area of the display region of the display screen and a failure to realize a true full screen.

The pushing mechanism 41 can drive the camera module 109 to move in the direction parallel to the display surface. When the camera module 109 is beyond the periphery of the housing 10, the reversing mechanism 42 can reverse the camera module 109 to enable the camera module to be switched from being used as the rear camera to being used as the front camera. In this way, the overall camera assembly 109 can be received within the housing 10. During using, the camera assembly 109 is driven to move to the outside of the housing 10 to take a shooting. The camera assembly 109 can be further reversed according to the needs, so as to switch the camera assembly 109 from being used for the rear shooting to being used for the front shooting. In this configuration, the camera assembly 109 does not occupy the display region of the electronic device 100, such that the electronic device 100 has a large display region, thereby facilitating the real full screen. For example, in an implementation, in order to switch the camera module 109 from being used as the rear camera to being used as the front camera, the camera module 109 is rotated 180 degrees about an axis in parallel with the non-display surface and the display surface.

In an implementation, the housing 10 has four sidewalls surrounding the display surface. The pushing mechanism 41 is configured to drive the camera module 109 to move beyond any one of the four sidewalls from the inside of the housing 10. The four sidewalls of the housing 10 has a first sidewall 11, a third sidewall 13, a second sidewall 14, and a fourth sidewall 12.

The housing 10 includes a first outer sidewall. It is noted that the first outer sidewall may be one of the first sidewall 11, the third sidewall 13, the second sidewall 14, or the fourth sidewall 12 of the housing 10. It is noted that the first sidewall 11 refers to a top surface of the housing 10, the third sidewall 13 refers to a left surface of the housing 10, the second sidewall 14 refers to a bottom surface of the housing 10, and the fourth sidewall 12 refers to a right surface of the housing 10. For example, in an implementation, the top surface of the housing 10 is normally used as a surface through which radio signals pass, the bottom surface of the housing 10 is normally used as a surface in which the microphone hole 106 is disposed, and the left surface of the housing 10 and the right surface of the housing 10 are normally held by a user's hand.

In some implementations, the camera module 109 is disposed in the housing 10, and the pushing mechanism 41 can drive the camera module 109 to move beyond the first sidewall 11 of the housing 10 from the inside of the housing 10. In another implementation, the pushing mechanism 41 can drive the camera module 109 to move beyond the fourth sidewall 12 of the housing 10 from the inside of the housing 10. In another implementation, the pushing mechanism 41 can drive the camera module 109 to move beyond the second sidewall 14 of the housing 10 from the inside of the housing 10. In another implementation, the pushing mechanism 41 can drive the camera module 109 to move beyond the third sidewall 13 of the housing 10 from the inside of the housing 10.

In an implementation, the pushing mechanism 41 includes at least one of a magnetic pushing mechanism, a driving motor mechanism, or an elastic pushing mechanism, so as to drive the camera module 109 to move. The manner in which the pushing mechanism 41 drives the camera module 109 to move to the outside of the housing 10 and the structure of the pushing mechanism 41 are not limited herein. It is noted that the manner in which the pushing mechanism 41 drives the camera module 109 to move to the outside of the housing 10 from the inside of the housing 10 may include but is not limited to the following. The pushing mechanism 41 includes a first magnetic member 413 and a second magnetic member 414. The first magnetic member 413 is disposed on the second surface 1092 of the camera module 109, and the second magnetic member 414 is disposed in the housing 10 and faces the first magnetic member 413. The first magnetic member 413 includes a magnet, and the second magnetic member 414 includes a coil. When the coil is energized, the magnet is repelled to move outward by the coil, and thus the camera module 109 is driven to move to the outside of the housing 10. When the camera module 109 is moved to the outside of the housing 10, a magnetic repulsion force between the camera module 109 and the housing 10 still exists to ensure that the camera module 109 is kept to be outside the housing 10. When the camera module 109 needs to be retracted into the housing 10, the coil is de-energized and then the camera module 109 returns to the inside of the housing 10.

In an implementation, the reversing mechanism 42 includes at least one of a magnetic reversing mechanism or a driving motor reversing mechanism, so as to drive the camera module 109 to reverse. The manner in which the reversing mechanism 42 drives the camera module 109 to reverse and the structure of the reversing mechanism 42 are not limited herein. It is noted that the manner in which the reversing mechanism 42 drives the camera module 109 to reverse may include but is not limited to the following. The reversing mechanism 42 includes a driving motor 427 and a telescopic rod 428. The driving motor 427 is disposed in the housing 10 and coupled with the telescopic rod 428. The telescopic rod 428 is fixedly connected with the second surface 1092. The driving motor 427 can drive the telescopic rod 428 to rotate, and rotation of the telescopic rod 428 enables rotation of the camera module 109. In an implementation, the driving motor 427 may be mounted in the housing 10, and alternatively, the driving motor 427 may be mounted on other electronic components of the electronic device 100. The telescopic rod 428 can be telescopic. When the pushing mechanism 41 drives the camera module 109 to move to the outside of the housing 10 and enables the camera module 109 to be kept to be outside the housing 10, the driving motor 427 then drives the telescopic rod 428 to rotate about its own central axis, and the rotation of the telescopic rod 428 enables the camera module 109 to reverse.

Figure 8:
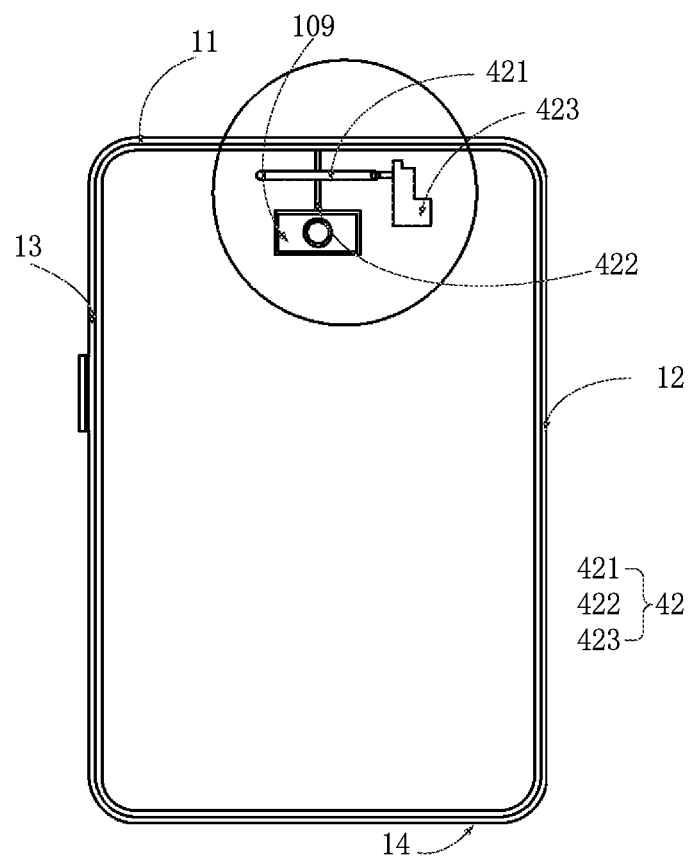
FIG. 8 is a rear view of the electronic device according to an implementation of the present disclosure.
Figure 9:
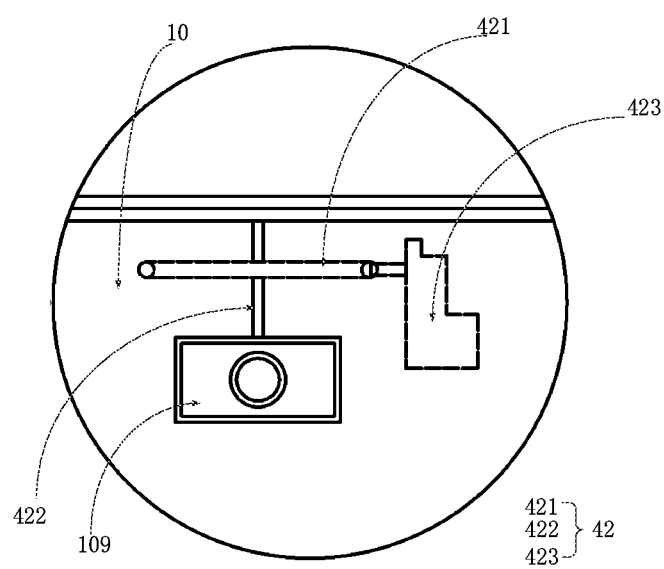
FIG. 9 is a partially enlarged view of a reversing mechanism of the electronic device according to an implementation of the present disclosure.

Referring to FIGS. 8 to 9, the pushing mechanism 41 can drive the camera module 109 to move in a direction from the display surface to the non-display surface. When the camera module 109 is driven to the outside of the housing 10 by the pushing mechanism 41, the reversing mechanism 42 can reverse the camera module 109 to be beyond the periphery of the housing 10. In the implementations of the present disclosure, the periphery of the housing 10 refers to a middle frame of the electronic device 100, and the middle frame is fixedly connected with the front housing 101 and the rear housing 102. It is noted that, when the camera module 109 is moved to be beyond the periphery of the housing 10, an orthographic projection of the camera module 109 does not overlap with an orthographic projection of the housing 10. When the camera module 109 is driven to be out of the housing 10 without being moved to be beyond the periphery of the housing 10, the orthographic projection of the camera module 109 overlaps with the orthographic projection of the housing 10.

Referring to FIGS. 8 to 9, in some implementations, the accommodating groove 103 is defined in the rear housing 102 in a direction perpendicular to a surface of the rear housing 102. The camera module 109 is accommodated in the accommodating groove 103. The pushing mechanism 41 is configured to drive the camera module 109 to move to the outside of the rear housing 102 along the accommodating groove 103 in a direction perpendicular to the rear housing 102. The reversing mechanism 42 can reverse the camera module 109. When the camera module 109 is driven to the outside of the rear housing 102, the reversing mechanism 42 can reverse the camera module 109 to be beyond the periphery of the housing 10, so as to enable the camera of the camera module 109 to face the same direction as the display surface. Alternatively, the accommodating groove 103 is defined in the rear housing 102 in a direction inclined to the surface of the rear housing 102. The pushing mechanism 41 can drive the camera module 109 to move to the outside of the rear housing 102 along the accommodating groove 103 in a direction inclined to the rear housing 102, and the reversing mechanism 42 can reverse the camera module 109. When the camera module 109 is moved to the outside of the rear housing 102, the reversing mechanism 42 then reverses the camera module 109 to be beyond the periphery of the rear housing 102, so as to enable the camera of the camera module 109 to face the same direction as the display surface. The accommodating groove 103 is defined in the rear housing 102, such that the camera module 109 can be received and hidden in the rear housing 102. It is noted that the accommodating groove 103 may be defined in the rear housing 102 in any of other multiple directions, such that the camera module 109 may be driven to the outside of the rear housing 102 along any of the other multiple directions, which will not be repeated herein. In another implementation, the accommodating groove 103 is defined in the housing 10, such that the entire camera module 109 can be received and hidden in the housing 10. It is noted that the accommodating groove 103 may be defined in the housing 10 in any of other multiple directions, such that the camera module 109 may be driven to the outside of the housing 10 along any of the other multiple directions, which will not be repeated herein.

In an implementation, the reversing mechanism 42 can reverse the camera module 109 to be beyond the first outer sidewall. It is noted that the first outer sidewall may be one of the first sidewall 11, the third sidewall 13, the second sidewall 14, or the fourth sidewall 12 of the housing 10.

Figure 10:
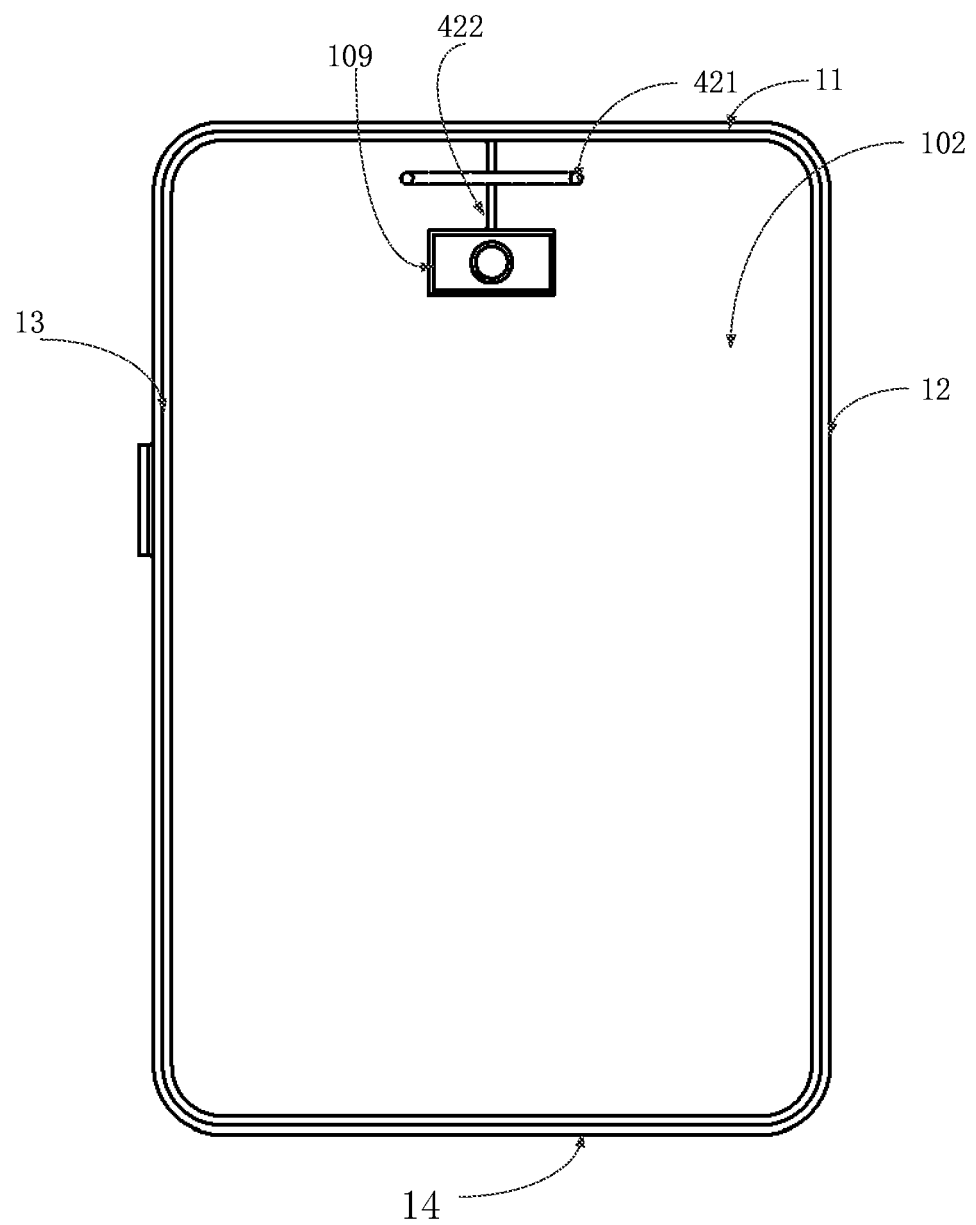
FIG. 10 is a rear view of the electronic device according to an implementation of the present disclosure.

Referring to FIG. 10, the first outer sidewall is the first sidewall 11 of the housing 10, and the camera module 109 is disposed within the housing 10 and close to the first sidewall 11. The pushing mechanism 41 and the reversing mechanism 42 are disposed between the camera module 109 and the first sidewall 11. The reversing mechanism 42 is coupled with the camera module 109. The reversing mechanism 42 reverses the camera module 109 toward the first sidewall 11, so as to reverse the camera module 109 to be beyond the first sidewall 11. Thus, the camera of the camera module 109 is oriented toward the same direction as the display surface, thereby enabling the camera module 109 to be switched from being used as the rear camera to being used as the front camera.

In some implementations, the first outer sidewall is the third sidewall 13 of the housing 10, and the camera module 109 is disposed within the housing 10 and close to the third sidewall 13. The pushing mechanism 41 and the reversing mechanism 42 are disposed between the camera module 109 and the third sidewall 13, and the reversing mechanism 42 is coupled with the camera module 109. The reversing mechanism 42 reverses the camera module 109 toward the third sidewall 13, so as to reverse the camera module 109 to be beyond the third sidewall 13. Thus, the camera of the camera module 109 is oriented toward the same direction as the display surface, thereby enabling the camera module 109 to be switched from being used as the rear camera to being used as the front camera.

In some implementations, the first outer sidewall is the fourth sidewall 12 of the housing 10, and the camera module 109 is disposed within the housing 10 and close to the fourth sidewall 12. The pushing mechanism 41 and the reversing mechanism 42 are disposed between the camera module 109 and the fourth sidewall 12, and the reversing mechanism 42 is coupled with the camera module 109. The reversing mechanism 42 reverses the camera module 109 toward the fourth sidewall 12, so as to drive the camera module 109 to be beyond the fourth sidewall 12. Thus, the camera of the camera module 109 is oriented toward the same direction as the display surface, thereby enabling the camera module 109 to be switched from being used as the rear camera to being used as the front camera.

In some implementations, the first outer sidewall is the second sidewall 14 of the housing 10, and the camera module 109 is disposed within the housing 10 and close to the second sidewall 14. The pushing mechanism 41 and the reversing mechanism 42 are disposed between the camera module 109 and the second sidewall 14, and the reversing mechanism 42 is coupled with the camera module 109. The reversing mechanism 42 reverses the camera module 109 toward the second sidewall 14, so as to drive the camera module 109 to be beyond the second sidewall 14. Thus, the camera of the camera module 109 is oriented toward the same direction as the display surface, thereby enabling the camera module 109 to be switched from being used as the rear camera to being used as the front camera.

In some implementations, the pushing mechanism 41 can drive the camera module 109 to move in a direction perpendicular to the display surface. When the camera module 109 is driven to be out of the housing 10 by the pushing mechanism 41, the reversing mechanism 42 can reverse the camera module 109 to be beyond the periphery of the housing 10.

In an implementation, the pushing mechanism 41 can drive the camera module 109 to move out of the housing 10 via a manual pressing or pulling. In an implementation, the pushing mechanism 41 includes a push-push ejection mechanism, so as to enable the camera module 109 to be pushed into the housing 10 and then pushed again triggering the push-push ejection mechanism to eject the camera module 109 from the housing 10. For example, as an implementation, the pushing mechanism 41 includes a spring and a snap structure. The camera module 109 is snapped into the housing 10 via the snap structure. The spring is disposed in the housing 10 and abuts against the camera module 109 and the housing 10. When the snap structure is unlocked, the camera module 109 is driven by the spring to move out of the housing 10. In another implementation, the pushing mechanism 41 may also be a power mechanism, and the camera module 109 is driven to move to the outside of housing 10 by the power mechanism. For example, the pushing mechanism 41 includes a motor and a connecting rod 422. The motor can drive the connecting rod 422 to rotate. The connecting rod 422 is coupled with the camera module 109. The connecting rod 422 can drive the camera module 109 to move to the outside of the housing 10. Therefore, it is appreciated that the pushing mechanism 41 may be structured in various manners, which are not described in detail herein.

In some implementations, the pushing mechanism 41 includes a third magnetic member 411 and a fourth magnetic member 412. The fourth magnetic member 412 is disposed on the camera module 109, and the third magnetic member 411 is disposed in the housing 10. The third magnetic member 411 can drive the fourth magnetic member 412 to move. When the third magnetic member 411 is energized, a magnetic field generated from the fourth magnetic member 412 interacts with the third magnetic member 411 to cause the fourth magnetic member 412 to be repelled by the third magnetic member 411, thereby driving the camera module 109 to move to the outside of the housing 10. Of course, when the third magnetic member 411 is energized with a current having an opposite direction, the fourth magnetic member 412 is attracted by the third magnetic member 411, so as to drive the camera module 109 to return back into the housing 10. The camera module 109 is controlled in this manner, so as to enable the electronic device 100 to be intelligent. Because the third magnetic member 411 is electrically controlled, a button may be displayed on an operating interface of the electronic device 100 to control energization and de-energization of the third magnetic member 411. When the camera module 109 needs to be switched from being used as the rear camera to being used as the front camera, the pushing mechanism 41 can be activated through the operating interface without pressing or pushing any other mechanical structures.

Figure 11:
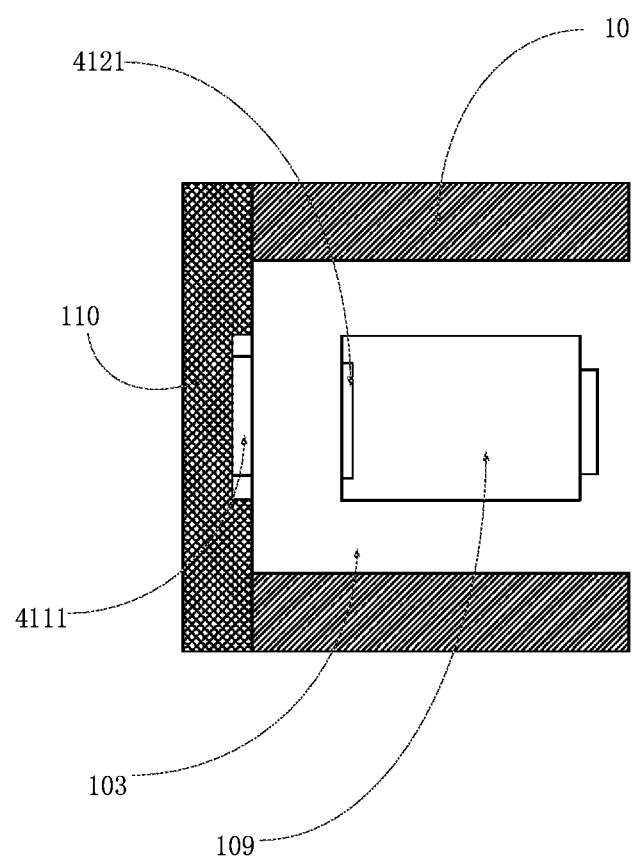
FIG. 11 is a schematic view illustrating a second implementation of the pushing mechanism of the electronic device according to an implementation of the present disclosure.

Referring to FIG. 11, in some implementations, the third magnetic member 411 includes a first coil 4111. The first coil 4111 is disposed in the sidewall of the accommodating groove 103 close to the display surface. The fourth magnetic member 412 includes a first magnet 4121. The first magnet 4121 is disposed on the side of the camera module 109 close to the display surface and faces the first magnet 4121. Alternatively, the first magnet 4121 may be disposed in the sidewall of the accommodating groove 103 close to the display surface, and the first coil 4111 may be disposed on the side of the camera module 109 close to the display surface and faces the first magnet 4121. In this way, a direction of a driving force generated between the first coil 4111 and the first magnet 4121 is in parallel to a direction of a movement of the camera module 109. Thus, the driving force enables the camera module 109 to be repelled out of the housing 10 quickly, thereby shortening duration for switching the camera module 109 from being used as the front camera to being used as the rear camera. In an implementation, the sidewall of the accommodating groove 103 close to the display surface may be referred to as the first sidewall 110 of the accommodating groove 103, and the two sidewalls of the accommodation groove provided with second coil may be referred to as two second sidewalls 112. The accommodating groove 103 is defined by the first sidewall 110, the bottom wall 111, and the two second sidewalls 112 connected with the first sidewall 110 and the bottom wall 111. As an example, in an implementation, the first sidewall 110 is in parallel with the display surface, and the two second sidewalls 112 are perpendicular to the display surface. It is noted that the first sidewall 110, the bottom wall 111, the two second sidewalls 112 are portions of the housing 10.

Figure 12:
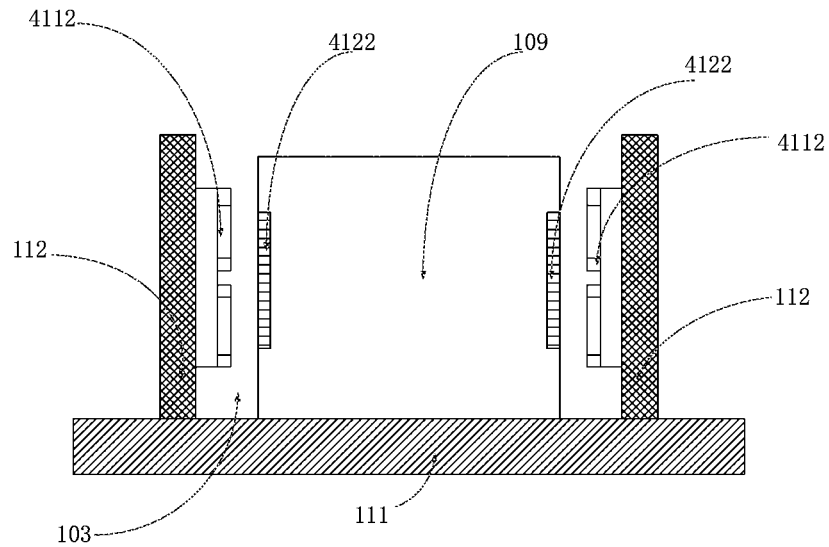
FIG. 12 is a schematic view illustrating a third implementation of the pushing mechanism of the electronic device according to an implementation of the present disclosure.
Figure 13:
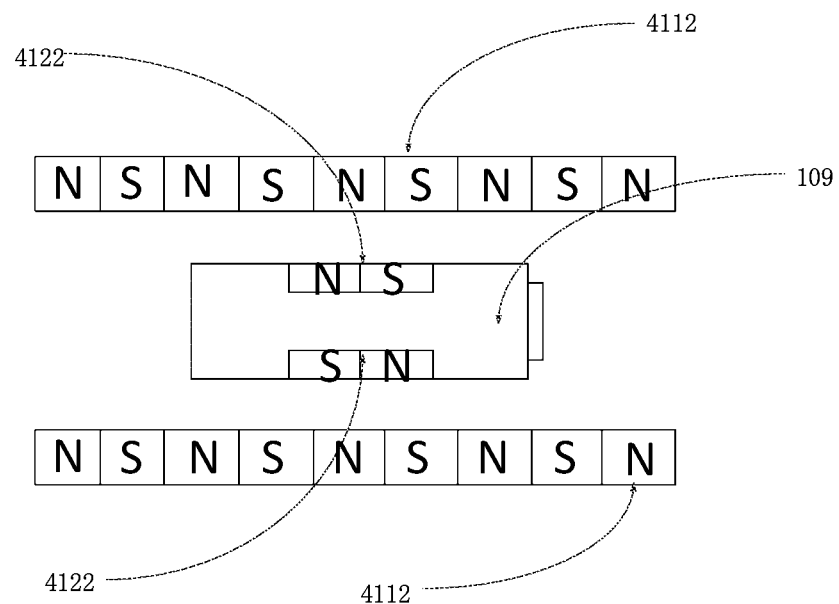
FIG. 13 is a schematic diagram illustrating the third implementation of the pushing mechanism of the electronic device illustrated in FIG. 12 according to an implementation of the present disclosure.

Referring to FIGS. 12 to 13, in some implementations, the third magnetic member 411 includes at least one second coil 4112. The at least one second coil 4112 is disposed on two sidewalls 112 of the accommodating groove 103 defined in the housing 10. The fourth magnetic member 412 includes at least one second magnet 4122, and the at least one second magnet 4122 is disposed on two sides of the camera module 109 corresponding to the at least one second coil 4112 (that is, the at least one second magnet 4122 is disposed on two sides of the camera module 109 and faces the at least one second coil 4112). It is noted that the at least one second magnet 4122 includes multiple second magnets 4122 that are arranged in such a way that magnetic poles of each two adjacent second magnets 4122 are oppositely oriented with each other (that is, as illustrated in FIG. 13, each two adjacent second magnets 4122 are arranged with opposing magnetic poles (S-N) adjacent). The at least one second coil 4112 has multiple second coils 4112 arranged in such a way that each two adjacent second coils 4112 are oppositely oriented with each other (that is, as illustrated in FIG. 13, each two adjacent second coils 4112 are arranged with opposing magnetic poles (S-N) adjacent). The multiple second coils 4112 can drive the multiple second magnets 4122 in sequence, such that the camera module 109 is driven to move to the outside of the housing 10. In this way, the camera module 109 is moderately driven without being subjected to strong impact forces, and it is beneficial to prolong the service life of the electronic device 100. Of course, alternatively, the at least one second magnet 4122 may be disposed on the two sidewalls 112 of the accommodation groove 103 defined in the housing 10. The at least one second coil 4112 may be disposed on the two sides of the camera module 109 corresponding to the at least one second magnet 4122 (that is, the at least one second coil 4112 is disposed on the two sides of the camera module 109 and faces the at least one second magnet 4122).

Figure 14:
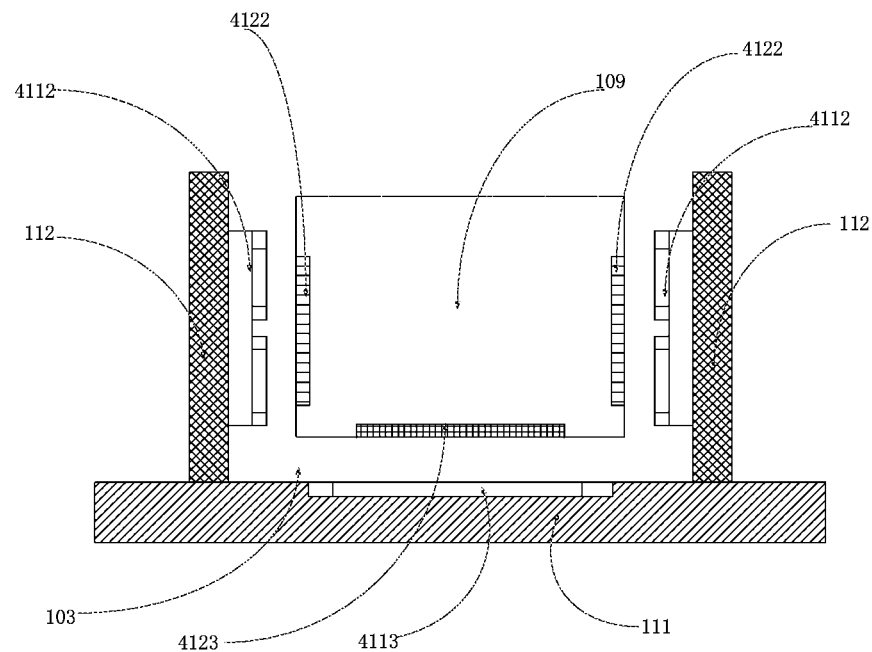
FIG. 14 is a side view illustrating a fourth implementation of the pushing mechanism of the electronic device according to an implementation of the present disclosure.

Referring to FIG. 14, in some implementations, the third magnetic member 411 further includes a third coil 4113. The third coil 4113 is disposed at the bottom wall 111 of the accommodating groove 103 defined in the housing 10. The second magnetic member 414 further includes a third magnet 4123, and the third magnet 4123 is disposed on a bottom of the camera module 109 opposite the third coil 4113. In this way, an electromagnetic repulsive force is generated between the third coil 4113 and the third magnet 4123, such that a gap is created between the camera module 109 and the bottom wall 111 of the accommodating groove 103 defined in the housing 10. The driving force generated between the first coil 4111 and the first magnet 4121 and the electromagnetic repulsive force generated between the third coil 4113 and the third magnet 4123 cooperatively enable the camera module 109 to be driven to the outside of the housing 10 along the accommodating groove 103. The gap defined between the bottom of the camera module 109 and the bottom wall 111 of the accommodating groove 103 enables a friction between the camera module 109 and the bottom wall 111 of the accommodating groove 103 to be reduced, such that the camera module 109 is not easily stuck during being driven to move to the outside of the housing 10. Of course, in another implementation, the third coil 4113 and the third magnet 4123 may also cooperate with the second coil 4112 and the second magnet 4122. The electromagnetic repulsive force generated between the third coil 4113 and the third magnet 4123 enables the gap to be created between the camera module 109 and the bottom wall 111 of the accommodating groove 103, and driving forces generated between the second coil 4112 and the second magnet 4122 drive the camera module 109 to move to the outside of the housing 10 along the accommodating groove 103. In yet another implementation, the first coil 4111 and the first magnet 4121, the second coil 4112 and the second magnet 4122, and the third coil 4113 and the third magnet 4123 cooperatively drive the camera module 109 to move to the outside of the housing 10.

Referring to FIG. 8, in some implementations, the reversing mechanism 42 includes a rotating shaft 421 and a connecting rod 422. The rotating shaft 421 is rotatably connected with the housing 10. The connecting rod 422 has an end fixedly connected with the rotating shaft 421 and another end connected with the camera module 109. It is noted that the rotating shaft 421 can be fixedly connected with the connecting rod 422 through a fixed connection such as a thread connection, an interference fit, or the like, which will not be repeated herein. Of course, in an implementation, the rotating shaft 421 and the connecting rod 422 can also be integrally formed. When the camera module 109 is driven to the outside of the housing 10 by the pushing mechanism 41, the rotation of the connecting rod 422 enables the camera module 109 to be reversed, thereby switching the camera module 109 from being used as the rear camera to being used as the front camera.

The rotating shaft 421 is mounted between the periphery of the housing 10 and the camera module 109. The connecting rod 422 has one end fixedly connected with the rotating shaft 421 and another end connected with the end of the camera module 109 close to the non-display surface. The rotating shaft 421 is rotated to drive the connecting rod 422 to rotate, and the rotation of the connecting rod 422 enables the camera module 109 to be reversed. In this implementation, the connecting rod 422 is coupled with the end of the camera module 109 close to the non-display surface. In this way, when the camera module 109 is reversed by the connecting rod 422, the connecting rod 422 can be in a close contact with the housing 10, thereby enabling the camera module 109 reversed to be in parallel with the display surface, and thus shooting is facilitated.

In some implementations, the connecting rod 422 is elastic or telescopic. As an example, in an implementation, the connecting rod 422 may be made of an elastic material, such as metal rubber, silicon steel, or the like. In another implementation, the connecting rod 422 may include a first connecting rod and a second connecting rod. The second connecting rod is movably disposed within the first connecting rod (for example, the first connecting rod is movably sleeved on the second connecting rod), and the first connecting rod is connected with the second connecting rod via a spring, thereby enabling the connecting rod 422 to be telescopic as a whole. In an implementation, the connecting rod 422 is connected to the end of the camera module 109 close to the display surface, and the accommodating groove 103 is defined in the housing 10 and extends in a direction perpendicular to the front housing 101 and the rear housing 102. Thus, when the pushing mechanism 41 drives the camera module 109 to move out from the accommodating groove 103, the camera module 109 is subjected to a resistance (that is, a longitudinal tensile force) applied by the connecting rod 422. For this reason, when the connecting rod 422 is elastic or telescopic, the resistance from the connecting rod 422 is decreased and enables the camera module 109 to be driven to smoothly move to the outside of the housing 10. In an implementation, the accommodating groove 103 is designed to extend along a movement path of the connecting rod 422, such that the camera module 109 can be driven to smoothly move to the outside of the housing 10.

In some implementations, the housing 10 defines an avoidance groove for at least partially accommodating the connecting rod 422. It is noted that the avoidance groove is defined in a shape substantially the same as the connecting rod 422, such that when the camera module 109 is reversed, the connecting rod 422 can be at least partially accommodated in the avoidance groove. In this way, the connecting rod 422 does not easily shake when being reversed, thereby ensuring stability of the camera module 109 used as the front camera and facilitating shooting.

In some implementations, the accommodating groove 103 has a guide surface disposed on the housing 10 and close to the non-display surface. In an implementation, the guide surface is a part of the surface of the rear housing 102. When the camera module 109 is driven to return to the accommodating groove 103, the camera module 109 is first driven toward the guide face, and then is driven to move through the guide surface into the accommodating groove 103, such that the guide surface facilitates the camera module 109 to be received within the accommodating groove 103.

In some implementations, the reversing mechanism 42 further includes a driving device 423. The driving device 423 is mounted on the housing 10 and is fixedly connected with the rotating shaft 421. When the camera module 109 is driven to move to the outside of the accommodating groove 103, the driving device 423 can drive the rotating shaft 421 to rotate. The rotation of the rotating shaft 421 drives the connecting rod 422 to rotate, and the connecting rod 422 drives the camera module 109 to reverse, thereby enabling the camera module 109 to be switched from being used as the rear camera to being used as the front camera. When the camera module 109 is switched from being used as the front camera to being used as the rear camera, the driving device can drive the rotating shaft 421 to reversely rotate. The rotating shaft 421 rotating reversely enables the camera module 109 out of the accommodating groove 103 to be moved toward and to face the accommodating groove 103, and then the camera module 109 is driven to be received within the accommodating groove 103, thereby enabling the camera module 109 to be switched from being used as the rear camera to being used as the front camera. A circuit board 431 is mounted in the electronic device 100, and the circuit board 431 may serve as a mainboard of the electronic device 100. The circuit board 431 may be integrated with at least one functional component such as a motor, a microphone, a speaker, an earphone jack, a universal serial bus interface, the camera module 109, a distance sensor, an ambient light sensor, a receiver, a processor, or the like. The earphone jack is disposed corresponding to (for example, facing) an earphone hole 105, the microphone is disposed corresponding to (for example, facing) a microphone hole 106, the universal serial bus interface is disposed corresponding to (for example, facing) a universal serial bus interface hole 107, and the loudspeaker is disposed corresponding to (for example, facing) a speaker hole 108.

In some implementations, the circuit board 31 is mounted in the electronic device 100. In an implementation, the circuit board 31 is connected to the driving device 423 via screws. Alternatively, the circuit board 31 may be snap-fitted to the driving device 423. It is noted that a manner in which the circuit board 31 is mounted to the driving device 423 according to the implementations of the present disclosure is not limited herein. In an implementation, the circuit board 31 may also be mounted to the driving device 423 in other manners, for example, by snap-fitting and screws.

The battery 32 is mounted in the electronic device 100. The battery 32 is electrically coupled with the circuit board 31 to provide power for the electronic device 100. The rear housing 102 may serve as a cover covering the battery 32. The rear housing 102 covers the battery 32 to protect the battery 32. In an implementation, the battery 32 is covered by the rear housing 102 to prevent the battery 32 from being damaged when the electronic device is subjected to collisions, drops, or the like.

An electronic device 100 is provided. The electronic device 100 includes the housing 10 and the camera module 109. The camera module 109 is accommodated in the housing 10. The pushing mechanism 41 and the reversing mechanism 42 are connected between the camera module 109 and the periphery of the housing 10. When the camera module 109 needs to be used as the front camera, the camera module 109 is first driven to move the outside of the housing 10 by the pushing mechanism 41, and then is reversed by the reversing mechanism 42 to be oriented toward the same direction as the display surface to perform the front shooting. In the implementations of the present disclosure, the front shooting and the rear shooting can be implemented thought only one camera module 109, thereby reducing the cost of the electronic device 100. Also, the structure of the camera module 109 in the implementations of the present disclosure facilitates the retraction and extension of the camera module 109. The camera module 109 with the above-identified structure does not occupy the display region of the electronic device 100 when performing the front shooting, such that the electronic device 100 has a large display region.

In some implementations, the electronic device 100 includes the housing 10 and the camera module 109. The housing 10 includes the display surface and the non-display surface. The housing 10 defines the accommodating groove 103, and the accommodating groove 103 extends in a direction perpendicular to the non-display surface of the housing 10. The camera module 109 is mounted in the accommodating groove 103, and the pushing mechanism 41 and the reversing mechanism 42 are connected between the camera module 109 and the housing 10. The pushing mechanism 41 can drive the camera module 109 to move to the outside of the accommodating groove 103. When the camera module 109 is driven to the outside of the housing 10 by the pushing mechanism 41, the reversing mechanism 42 can reverse the camera module 109 to be beyond the periphery of the housing 10. The pushing mechanism 41 includes the third magnetic member 411 and the fourth magnetic member 412. The third magnetic member 411 includes the first coil 4111. The first coil 4111 is disposed in the sidewall of the accommodating groove 103 close to the display surface. The fourth magnetic member 412 includes the first magnet 4121. The first magnet 4121 is disposed at the side of the camera module 109 close to the display surface and faces the first coil 4111. The first magnetic member 413 further includes the third coil 4113 disposed on the bottom wall 111 of the accommodating groove 103 defined in the housing 10. The fourth magnetic member 412 further includes the third magnet 4123. The third magnet 4123 is disposed on the bottom of the camera module 109 and faces the third coil 4113. The reversing mechanism 42 is mounted between the periphery of the housing 10 and the camera module 109, and the reversing mechanism 42 is coupled with the camera module 109. The reversing mechanism 42 includes the rotating shaft 421, the connecting rod 422, and the driving device 423. The driving device 423 is mounted on the housing 10 and is fixedly connected with the rotating shaft 421. The rotating shaft 421 is rotatably connected with the housing 10. The connecting rod 422 has the end fixedly connected with the rotating shaft 421 and the anther end connected with the camera module 109. The rotating shaft 421 is mounted between the periphery of the housing 10 and the camera module 109. The connecting rod 422 has the end fixedly connected with the rotating shaft 421 and the another end connected with the end of the camera module 109 close to the non-display surface. The connecting rod 422 has elasticity. The housing 10 defines the avoidance groove for at least partially accommodating the connecting rod 422. The accommodating groove 103 has the guide surface disposed on the housing 10 and close to the non-display surface (for example, the guide surface is disposed in the rear housing 102).

During switching the camera module 109 from being used as the rear camera to being used as the front camera, the first coil 4111, the first magnet 4121, the second coil 4112, and the second magnet 4122 of the pushing mechanism 41 cooperatively drive the camera module 109 to move to the outside of the housing 10 along the accommodation groove 103. By the electromagnetic repulsive force generated between the third coil 4113 and the third magnet 4123, the gap is created between the camera module 109 and the bottom wall 111 of the accommodating groove 103, which is beneficial for driving the camera module 109 to move. During driving the camera module 109, the connecting rod 422 has elasticity and is compressible. When the camera module 109 is driven to the outside of the housing 10, the driving device 423 of the reversing mechanism 42 can drive the rotating shaft 421 to rotate. The rotation of the rotating shaft 421 causes the rotation of the connecting rod 422, the connecting rod 422 is reversed with the rotation of the camera module 109 until the connecting rod 422 is received in the avoidance groove, and thus the camera module 109 is reversed to be beyond the periphery of the housing 10. In this way, the camera module 109 is oriented toward the same direction as the display surface, and the switch of the camera module 109 from being used as the rear camera to being used as the front camera is completed.

During switching the camera module 109 from being used as the front camera to being used as the rear camera, the driving device rotates in reverse to drive the driving shaft 421 to rotate in reverse. The rotation of the rotating shaft 421 causes the rotation of the connecting rod 422. The camera module 109 is reversed by the connecting rod 422 to face the accommodating groove 103 at the outside of the accommodating groove 103. The guide surface formed on a periphery of an outer side of the accommodating groove 103 is beneficial for guiding the camera module 109 outside the accommodating groove 103 to move back into the accommodating groove 103. During driving the camera module 109 out of the accommodating groove 103 to move back into the accommodating groove 103, the first coil 4111 is reversely energized to attract the first magnet 4121 and the second coil 4112 is reversely energized to attract the third magnet 4123, the third coil 4113 and the third magnet 4123 enable the gap to be maintained between the camera module 109 and the bottom wall 111 of the accommodating groove 103, and thus a switch of the camera module 109 from being used as the front camera to being used as the rear camera is completed.

Figure 15:
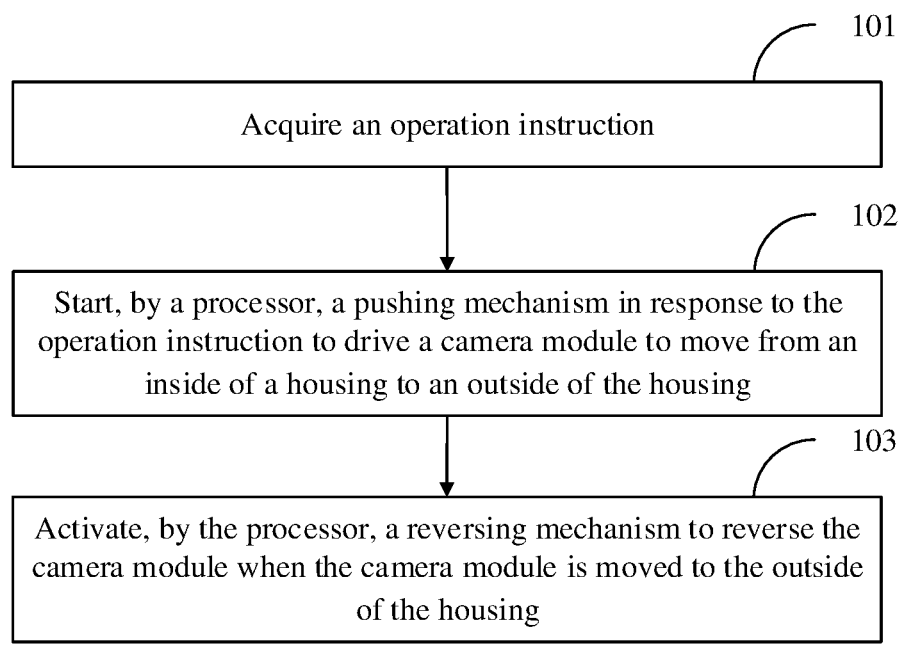
FIG. 15 is a flow chart illustrating a method for controlling the camera module according to an implementation of the present disclosure.

FIG. 15 is a flow chart illustrating a method for controlling the camera module 109 applicable to the electronic device 100 according to an implementation of the present disclosure. The electronic device 100 includes the housing 10, the camera module 109, the pushing mechanism 41, and the reversing mechanism 42. The camera module 109, the pushing mechanism 41, the reversing mechanism 42, and a processor are disposed in the housing 10. The pushing mechanism 41 and the reversing mechanism 42 are electrically coupled with the processor. The method for controlling the camera module 109 includes the following. At block 101, an operation instruction is acquired. At block 102, the processor starts the pushing mechanism 41 in response to the operation instruction to drive the camera module 109 to move from the inside of the housing 10 to the outside of the housing 10. At block 103, when the camera module 109 is moved to the outside of the housing 10, the processor activates the reversing mechanism 42 to reverse the camera module 109.

In an implementation, operations carried out at block 102 includes the following. The processor starts the pushing mechanism 41 in response to the operation instruction to drive the camera module 109 to move beyond any one of the four sidewalls of the housing 10, where the four sidewalls of the housing 10 surround the display surface of the electronic device 100.

In an implementation, the operations carried out at block 102 includes the following. The processor starts the pushing mechanism 41 in response to the operation instruction to drive the camera module 109 to move in a direction parallel to the display surface of the electronic device 100 to the outside of the housing 10.

In an implementation, operations carried out at block 103 includes the following. When the camera module 109 is moved to the outside of the housing 10, the processor activates the reversing mechanism 42 to reverse the camera module 109, where the camera module 109 reversed is operable to be switched from being used as the rear camera to being used as the front camera of the electronic device 100.

For example, when a shooting button on the operating interface of the electronic device 100 is clicked, the processor controls the pushing mechanism 41 to be energized. The pushing mechanism 41 drives the camera module 109 from the inside of the housing 10 to the outside of the housing 10. When the camera module 109 is moved to the outside of the housing 10, the processor activates the reversing mechanism 42 to reverse the camera module 109.

The electronic devices provided by the implementations of the present disclosure are introduced in detail in the foregoing, and specific examples are applied herein to set forth the principle and the implementations of the present disclosure, and the foregoing illustration of the implementations is only to help in understanding the present disclosure. Meanwhile, those of ordinarily skill in the art may make variations and modifications to the present disclosure in terms of the specific implementations and application scopes according to the ideas of the present disclosure. Therefore, the specification shall not be construed as limitations to the present disclosure.

What is claimed is:

1. An electronic device comprising:
   a housing;
   a camera module disposed in the housing;
   a display surface;
   a non-display surface opposite the display surface;
   a pushing mechanism configured to drive the camera module to move in a direction from the display surface to the non-display surface; and
   a reversing mechanism configured to reverse the camera module to be beyond a periphery of the housing when the camera module is driven to an outside of the housing by the pushing mechanism.

2. The electronic device of claim 1, wherein the pushing mechanism is configured to drive the camera module to move to the outside of the housing in one of a direction perpendicular to the display surface or a direction oblique to the display surface.

3. The electronic device of claim 1, wherein
   the housing has four sidewalls surrounding the display surface; and
   the reversing mechanism is configured to reverse the camera module to be beyond any one of the four sidewalls, so as to enable a camera of the camera module reversed to be switched from being used as a rear camera to being used as a front camera.

4. The electronic device of claim 1, wherein the reversing mechanism comprises a first reversing portion and a second reversing portion, wherein the first reversing portion is configured to reverse the camera module to be beyond the periphery of the housing, and the second reversing portion is configured to reverse the camera module to enable a camera of the camera module to be switched from being used as a rear camera to being used as a front camera.

5. The electronic device of claim 1, wherein the pushing mechanism comprises a third magnetic member and a fourth magnetic member, wherein the third magnetic member is disposed in the housing, the fourth magnetic member is disposed on the camera module, and the third magnetic member is configured to drive the fourth magnetic member to move.

6. The electronic device of claim 5, wherein
   the housing defines an accommodating groove;
   the camera module is received in the accommodating groove;
   the third magnetic member comprises a first coil, wherein the first coil is disposed in a sidewall of the accommodating groove close to the display surface; and
   the fourth magnetic member comprises a first magnet, wherein the first magnet is disposed on a side of the camera module close to the display surface and faces the first coil.

7. The electronic device of claim 6, wherein the reversing mechanism is mounted between the periphery of the housing and the camera module, and the reversing mechanism comprises a rotating shaft, a connecting rod, and a driving device, wherein the rotating shaft is rotatably connected with the housing, the connecting rod has an end fixedly connected with the rotating shaft and another end connected with the camera module, the driving device is mounted on the housing, and the driving device is fixedly connected with the rotating shaft and is configured to drive the rotating shaft to rotate.

8. The electronic device of claim 1, wherein the reversing mechanism is configured to drive the camera module to reverse about one of a lateral axis or a longitudinal axis of the camera module.

9. An electronic device comprising:
   a display surface and a non-display surface opposite the display surface;
   a housing defining an accommodation groove;
   a camera module received in the accommodation groove;
   a pushing mechanism comprising a first coil, a second coil, a third coil, a first magnet, a second magnet, and a third magnet, wherein the first coil is disposed in a sidewall of the accommodating groove close to the display surface, the first magnet is disposed on a side of the camera module close to the display surface and faces the first coil, the second coil is disposed on two sidewalls of the accommodation groove defined in the housing, the second magnet is disposed on two sides of the camera module corresponding to the second coil, the third coil is disposed on a bottom wall of the accommodating groove, and the third magnet is disposed on a bottom of the camera module corresponding to the third coil; and
   a reversing mechanism mounted between a periphery of the housing and the camera module, wherein the reversing mechanism is coupled with the camera module and configured to reverse the camera module.

10. The electronic device of claim 9, wherein
the camera module has a first surface close to the periphery of the housing and a second surface opposite the first surface; and
the reversing mechanism comprises a driving motor and a telescopic rod, wherein the driving motor is disposed in the housing and coupled with the telescopic rod, the telescopic rod is fixedly connected with the second surface, the driving motor is configured to drive the telescopic rod to rotate, and rotation of the telescopic rod enables rotation of the camera module.

11. The electronic device of claim 9, wherein
the housing has four sidewalls surrounding the display surface; and
the pushing mechanism is configured to drive the camera module to move beyond any one of the four sidewalls from an inside of the housing.

12. The electronic device of claim 9, wherein
the pushing mechanism is configured to drive the camera module to move in a direction parallel to the display surface; and
when the camera module is beyond the periphery of the housing, the reversing mechanism is configured to reverse the camera module to enable the camera module to be switched from being used as a rear camera to being used as a front camera.

13. A method for controlling a camera module applicable to an electronic device, wherein the electronic device comprises a housing, a camera module, a pushing mechanism, and a reversing mechanism, wherein the camera module, the pushing mechanism, the reversing mechanism, and a processor are disposed in the housing, and the pushing mechanism and the reversing mechanism are electrically coupled with the processor, and wherein the method for controlling the camera module comprises:
acquiring an operation instruction;
starting, by the processor, the pushing mechanism in response to the operation instruction to drive the camera module to move in a direction parallel to a display surface of the electronic device to an outside of the housing; and
activating, by the processor, the reversing mechanism to reverse the camera module when the camera module is moved to the outside of the housing, wherein the camera module reversed is operable to be switched from being used as a rear camera to being used as a front camera of the electronic device.

* * * * *

UNITED STATES PATENT AND TRADEMARK OFFICE
CERTIFICATE OF CORRECTION

PATENT NO. : 11,381,725 B2
APPLICATION NO. : 16/990492
DATED : July 5, 2022
INVENTOR(S) : Zhang et al.

It is certified that error appears in the above-identified patent and that said Letters Patent is hereby corrected as shown below:

On the Title Page

Item (73) Assignees:
Please delete "GUANGDONG OPPO MOBILE, Dongguan (CN); TELECOMMUNICATIONS CORP., LTD., Dongguan (CN)"

And insert -- GUANGDONG OPPO MOBILE TELECOMMUNICATIONS CORP., LTD., Dongguan (CN) --

Signed and Sealed this
Thirtieth Day of August, 2022

Katherine Kelly Vidal
*Director of the United States Patent and Trademark Office*